(12) United States Patent
Outlaw et al.

(10) Patent No.: US 7,985,472 B2
(45) Date of Patent: *Jul. 26, 2011

(54) LOW-GLOSS DRY-ERASE COATING FORMULATION

(75) Inventors: Mark O'Neil Outlaw, Charlotte, NC (US); Michael Ray Carter, Charlotte, NC (US)

(73) Assignee: Exopack-Technology, LLC, Spartanburg, SC (US)

( * ) Notice: Subject to any disclaimer, the term of this patent is extended or adjusted under 35 U.S.C. 154(b) by 1040 days.

This patent is subject to a terminal disclaimer.

(21) Appl. No.: 11/767,139

(22) Filed: Jun. 22, 2007

(65) Prior Publication Data

US 2008/0318064 A1 Dec. 25, 2008

(51) Int. Cl.
*B32B 27/40* (2006.01)
(52) U.S. Cl. ........ 428/341; 428/331; 428/340; 428/342; 428/412; 428/423.7; 428/425.3; 428/425.6; 428/425.8; 428/430; 428/431; 428/458; 428/475.2; 428/481; 428/482; 428/483
(58) Field of Classification Search .................. 428/331, 428/340, 341, 342, 412, 423.7, 425.3, 425.6, 428/425.8, 430, 431, 458, 475.2, 481, 482, 428/483
See application file for complete search history.

(56) References Cited

U.S. PATENT DOCUMENTS

| | | |
|---|---|---|
| 3,966,572 A | 6/1976 | Carder |
| 4,169,167 A | 9/1979 | McDowell |
| 5,811,472 A | 9/1998 | Patel |
| 6,354,227 B1 | 3/2002 | Feldpausch et al. |
| 6,423,418 B1 | 7/2002 | Callicott et al. |
| 6,426,034 B1 | 7/2002 | McComas et al. |
| 6,448,302 B1 | 9/2002 | Dawson et al. |
| 6,476,965 B1 | 11/2002 | He et al. |
| 6,760,999 B2 | 7/2004 | Branc et al. |
| 6,787,225 B2 | 9/2004 | Dawson et al. |
| 6,833,186 B2 * | 12/2004 | Perrine et al. .................. 428/329 |
| 2004/0077497 A1 | 4/2004 | Korane et al. |
| 2005/0112324 A1 | 5/2005 | Rosenbaum et al. |
| 2005/0260414 A1 | 11/2005 | MacQueen |
| 2006/0287408 A1 | 12/2006 | Baikerikar et al. |
| 2009/0017313 A1 | 1/2009 | Outlaw et al. |
| 2010/0327493 A1 | 12/2010 | Fong et al. |

FOREIGN PATENT DOCUMENTS

| | | |
|---|---|---|
| EP | 0442305 | 8/1991 |
| EP | 1 930 381 A1 | 6/2008 |
| FR | 2630353 | 10/1989 |
| WO | 0153421 | 7/2001 |
| WO | 2007/043728 A1 | 4/2007 |

(Continued)

OTHER PUBLICATIONS

Office Action of foreign counterpart application No. EP 08 771 547.0 mailed Apr. 6, 2010.

(Continued)

*Primary Examiner* — D. S Nakarani
(74) *Attorney, Agent, or Firm* — Summa, Additon & Ashe, P.A.

(57) ABSTRACT

An EB (electron beam) or UV (ultra violet) curable, low-gloss, dry-erase coating formulation for static and electronic whiteboards is disclosed. The coating contains an acrylate silica blend, an aliphatic urethane acrylate or a polyester acrylate, a polyfunctional reactive diluent and at least one photoinitiator.

17 Claims, 2 Drawing Sheets

FOREIGN PATENT DOCUMENTS

WO 2009/009273 1/2009

OTHER PUBLICATIONS

Darocur 1173 data sheet, Apr. 2001.
Photomer 5010 data sheet, Oct. 2003.
Photomer 6019 data sheet, Sep. 2009.
Photomer 5429 data sheet, Apr. 2006.
Photomer 4399 data sheet, Sep. 2009.
Photomer products data sheet, 2003.
International Search Report for foreign counterpart Application No. PCT/US2008/067598; mailing date Sep. 4, 2008; 3 pages.
International Search Report for foreign counterpart Application No. PCT/US2008/067603; mailing date Sep. 3, 2008; 2 pages.

* cited by examiner

LOW-GLOSS DRY-ERASE COATING FORMULATION

BACKGROUND

The present invention relates to a low-gloss dry-erase coating formulation. More specifically, the invention relates to an EB (electron beam) curable or UV (ultra violet) curable, low-gloss, dry-erase coating formulation. The invention further relates to methods of manufacturing the low-gloss dry-erase coating formulation.

Dry-erase boards also referred to as "whiteboards", have become popular replacements to paper and chalkboards, as they are convenient, inexpensive, and versatile. Additionally, whiteboard surfaces can be combined with optical and electronic capabilities to produce surfaces from which the images can be reproduced, either on paper or digitally. Because of the capabilities that go far beyond those of traditional whiteboards, electronic whiteboards are also gaining popularity.

EB/UV-curable coatings are desirable for dry-erase surfaces as they are abrasion resistant and smooth. These EB/UV-curable coatings, however, produce high gloss surfaces. High gloss surfaces tend to create eyestrain and are difficult to see from certain angles. Thus, in many applications, low-gloss surfaces are desirable as they reduce eyestrain and can be viewed more easily from different angles.

The gloss in the coatings can be reduced by roughening the coating through the process of embossing or wrinkling. Gloss can also be reduced by introducing additives (i.e., matting agents such as silica). Surface roughening, however, may introduce sites that trap stains and inks and produce "ghosting", i.e., a residual image of previously written material that remains after the writing is erased.

In addition, the gloss-reducing additives when added to the coating formulation tend to disperse imperfectly. Thus, dispersing equipment and dispersing agents, such as surface tension modifiers, are required for evenly dispersing these additives in the coating formulation.

In view of the aforementioned, it is desirable to minimize the use of both i.e., the surface roughening agents and the dispersing equipment and/or dispersing agents in the coating formulation.

It is further desirable to have an EB/UV curable, low-gloss, dry-erase coating formulation that are used to form hardcoats with minimal or preferably no "ghosting".

Several patents disclose dry-erase compositions:

U.S. Pat. No. 6,476,965 (He et al.) discloses a dry erasable substrate and projection screen having a dry-erase low-gloss top layer, a pigmented layer, and a bead matrix layer comprising glass beads. The dry erasable top layer as disclosed in this invention, however, contains additives such as flatting agents that require dispersing agent and equipment to evenly disperse these additives. Further, it includes a pigmented layer and a bead matrix layer to form the low-gloss, dry-erasable article.

U.S. Patent Application No. 2004/0077497 (Korane et al.) discloses dry-erase surfaces produced from heat-cured resins. The dry-erase surfaces in this invention, however, use additives (e.g. flatting agents like amorphous precipitated silica) to reduce gloss. Thus, the composition disclosed in this application requires dispersing agents to evenly disperse the additives. Further, the reduced gloss, dry-erase surface as disclosed in this application is produced from heat-cured resins.

There is a need for an EB/UV-curable dry-erase coating formulation that has very low-gloss and yet minimizes the use of surface roughening agents, additives, dispersing equipment and/or dispersing agents.

There is a further need for EB/UV-curable low-gloss, dry-erase coating formulation that has enhanced dry-erase properties yet has superior writability (i.e., a marker is able to wet the dry-erase surface formed from the present coating formulation without dewetting or reticulation.)

There is a further need for EB/UV-curable low-gloss, dry-erase coating formulation that is capable of forming into a hard, abrasion and chemical resistant coating and yet is substantially flexible.

SUMMARY

In one aspect, the present invention is an EB/UV-curable, low-gloss, dry-erase coating formulation for static dry-erase boards.

In another aspect, the present invention is dry-erase coating formulation for dynamic surfaces (e.g., electronic whiteboards).

In another aspect, the present invention is an EB/UV-curable low-gloss; dry-erase hardcoat formed from the coating formulation of the present invention that has enhanced dry-erase properties yet has superior writability.

In yet another aspect, the present invention is an EB/UV-curable low-gloss, dry-erase coating formulation that is capable of forming into a hard, abrasion and chemical resistant hardcoat and yet is substantially flexible.

In yet another aspect, the present invention is a static dry-erase board prepared with the aforementioned coating formulation.

In yet another aspect, the present invention is an electronic whiteboard prepared with the aforementioned coating formulation.

The foregoing, as well as other objectives and advantages of the present invention and the manner in which the same are accomplished, are further specified within the following detailed description and its accompanying drawings.

DETAILED DESCRIPTION

The present invention is an EB/UV-curable low-gloss coating formulation for coating dry-erase whiteboards (e.g., static and electronic whiteboards).

In one embodiment, the invention is a coating formulation formed from an acrylate silica blend (i.e., a blend of a polyester acrylate, an aliphatic acrylate, acrylic monomer, and silica), a urethane acrylate or a polyester acrylate, and a polyfunctional reactive diluent.

The coating formulation according to the present invention may further include at least one photoinitiator for UV-curable applications.

In addition, the coating formulation may include a polymeric dispersant for evenly dispersing various ingredients (e.g., silica) of the coating formulation.

The acrylate silica blend (e.g., PHOTOMER® 5010) in the coating formulation is the primary gloss reducing binder in the EB/UV-curable dry-erase coating formulation. It produces low-gloss EB/UV-curable hardcoats in difficult to matte EB/UV coatings while eliminating the need for dispersing equipment and handling silica. This formulated product can be incorporated into the coating formulation by simple mixing. In addition, this formulated product forms an incompatible phase during curing to produce microroughness. The presence of silica as well as the microroughness formed from the incompatible phase may be responsible for the low gloss values of the present coating formulation.

The aforementioned acrylate silica blend typically includes dipropylene glycol diacrylate in an amount between about 30 to 50 weight percent of the blend. Further, it may include isodecyl acrylate in an amount between about 10 to 30 weight percent of this blend. In addition, a polyester acrylate may be added to the silica blend in an amount between about 30 to 50 weight percent of the blend. The aliphatic acrylate is typically responsible for forming an incompatible phase during curing to produce microroughness. The coating may further contain silica in an amount between about 0.1 to 20 weight percent of the blend. The silica also contributes to the microroughness that occurs as the hardcoat is formed.

Figure 1:
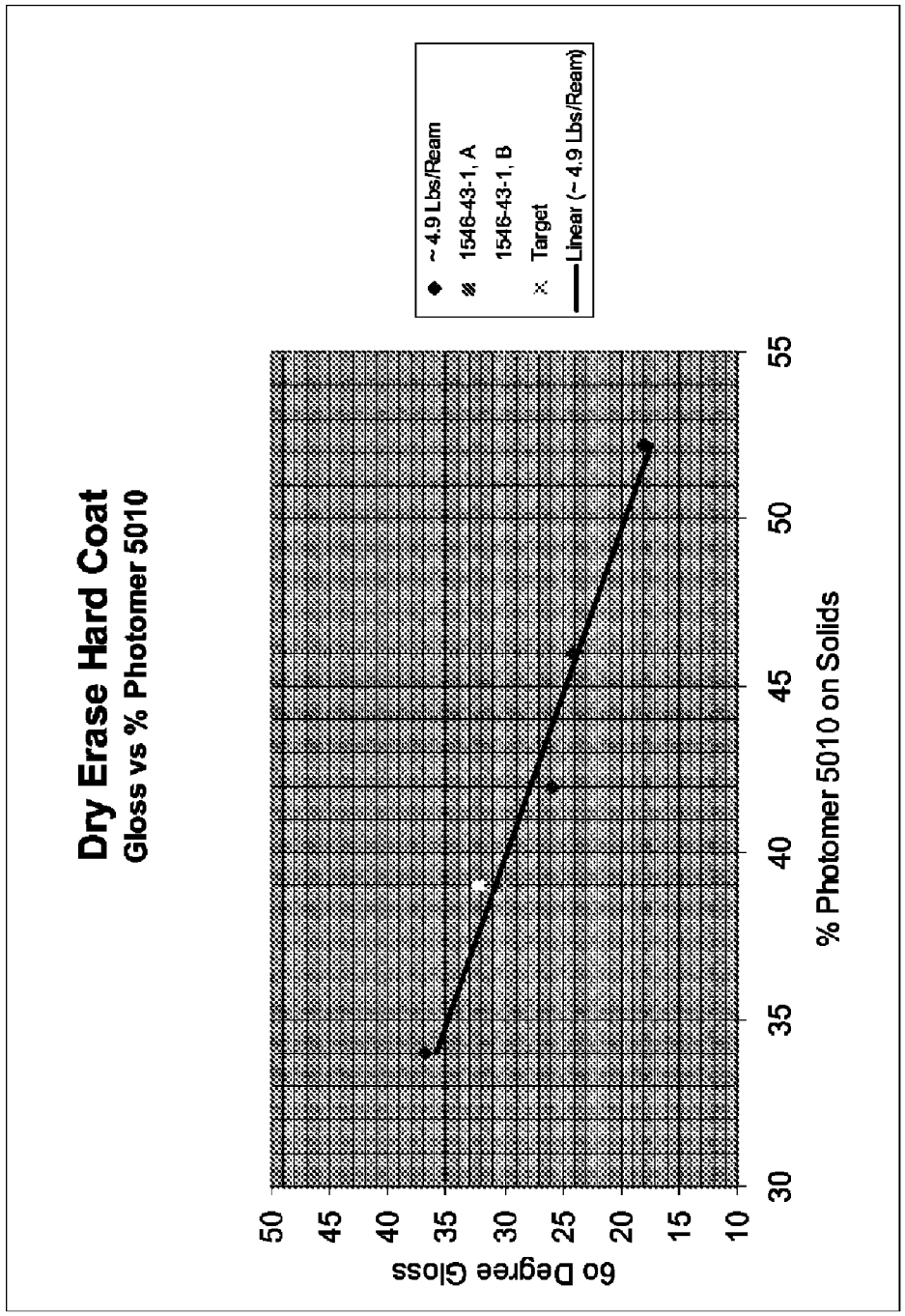
FIG. 1 is a graph depicting gloss values versus the concentration of PHOTOMER® 5010 (i.e., a blend of polyester acrylate, an aliphatic acrylate, acrylic monomer, and silica) for the hardcoat formed from the coating formulation of the present invention.

Typically, for the hardcoat formed from this coating formulation, gloss is inversely proportional to the concentration of the acrylate silica blend. See FIG. 1, which plots 60-degree gloss versus concentration of PHOTOMER® 5010 as applied at 4.9-5.0 lbs/ream (wherein one ream is equal to 3000 sq.ft.).

In one embodiment, the acrylate silica blend is present in the coating formulation in an amount between about 25 and 65 percent by weight. Typically, the acrylate silica blend is present in the coating formulation in an amount between about 30 and 50 percent by weight (e.g., between about 35 and 45 percent by weight).

An aliphatic urethane acrylate (e.g., PHOTOMER® 6019, PHOTOMER® 6010, PHOTOMER® 6210, and PHOTOMER® 6184) may be added to the acrylate silica blend to improve the properties of cured coatings produced from the coating formulation of the present invention. For instance, an aliphatic urethane acrylate may be added to enhance the non-yellowing characteristics of the coating film (i.e., the hardcoat) formed from the coating formulation of the present invention. Those skilled in the art will recognize the benefits of using aliphatic versus aromatic urethane acrylates for their non-yellowing characteristics. Further, aliphatic urethane acrylates may enhance physical properties of the coating formulation such as scratch, scuff, and mar resistance.

In another embodiment, a polyester acrylate (e.g., PHOTOMER® 5429) may be added to the coating formulation instead of an aliphatic urethane acrylate.

The aliphatic urethane acrylate (alternatively, a polyester acrylate) may be present in the coating formulation in an amount between about 5 and 35 percent by weight. Typically, the aliphatic urethane acrylate is present in the coating formulation in an amount between about 10 and 30 percent by weight. More typically, the aliphatic urethane acrylate is present in the coating formulation in an amount between about 15 and 25 percent by weight.

A polyfunctional reactive diluent (e.g., PHOTOMER® 4399) may be added to the coating formulation of this invention to further enhance the properties of cured coatings/hardcoats. This may be added for improving abrasion and scratch resistance of the cured coatings. These compounds may also impart hardness to the cured coatings.

Those skilled in the ordinary art would recognize that a polyfunctional reactive diluent such as a pentafunctional acrylate monomer would increase crosslink density and therefore the hardness, toughness, and chemical resistance, in general when reacted with other oligomers and monomers. In this regard, those skilled in the art would know that oligomers, as defined by the International Union Of Pure and Applied Chemistry, are "molecule(s) of intermediate relative molecular mass, the structure of which essentially comprises a small plurality of units derived, actually or conceptually, from molecules of lower relative mass." (1996 IUPAC, Pure and Applied Chemistry 68, 2287-2311) Thus, the polyfunctional reactive diluent may be added to the coating formulation to increase the crosslink density of the coating during polymerization, using either EB or UV radiation, by linking together the oligomers present in the formulation.

Further, the polyfunctional reactive diluent may also impart enhanced dry-erase properties to the present coating formulation.

In one embodiment, the polyfunctional reactive diluent is present in the coating formulation in an amount between about 20 and 50 percent by weight. Typically, the polyfunctional reactive diluent is present in the coating formulation in an amount between about 25 and 45 percent by weight. More typically, the polyfunctional reactive diluent is present in the coating formulation in an amount between about 30 and 40 percent by weight.

Photoinitiators may be included in the coating formulation to initiate photopolymerization of chemically unsaturated prepolymers (e.g., the polyester acrylate oligomers) in combination with monofunctional or multifunctional monomers. When exposed to UV radiation, photoinitiators absorb light to produce free radicals. These free radicals initiate the polymerization of the unsaturated compounds in the coating formulation. Examples of non-yellowing and minimal yellowing photoinitiators that may be used in the coating formulation of the present invention include but are not limited to $\alpha$-hydroxyketones such as Ciba® DAROCUR® 1173 and Ciba® IRGACURE® 184.

Photoinitiators may be present in the coating formulation in an amount between about 0.5 and 5 percent by weight. Typically, the photoinitiators are present in the coating formulation in an amount between about 1.5 and 4.5 percent by weight.

Generally, more than one photoinitiator[s] may be added to UV-curable coating formulation of the present invention. Typically, at least two photoinitiators may be added to the coating formulation.

In addition, a polymeric dispersant such as a carboxyl functional polymer may be added to stabilize the silica in the coating formulation to prevent agglomeration that may cause coating streaks during application of the coating formulation. More typically, a carboxyl functional polyacrylate (e.g., TEXAPHOR® 3250) may be used as a polymeric dispersant due to its compatibility with the other compounds of the coating formulation.

The polymeric dispersant may include a solvent e.g., heavy aromatic naphtha (CAS 64742-94-5). It may further include propylene glycol methyl ether acetate.

This polymeric dispersant may be present in the coating formulation in an amount between about 0.01 and 1.5 percent by weight. Typically, the polymeric dispersant may be present in the coating formulation between about 0.05 to 1 percent by weight.

Depending upon the technique used for coating a surface, the present formulation may be dissolved in a solvent (i.e., t-butyl acetate, ethanol, toluene, ethyl acetate, isopropyl alcohol, toluene and their blends).

Typically, exempt solvents such as t-butyl acetate are preferred for inclusion in the present coating formulation. Those skilled in the ordinary art would appreciate that these types of solvents are preferred as they are exempt from regulation by the EPA as VOC's (Volatile Organic Compounds) since they have been determined scientifically not to contribute to the formation of ozone and thus are environment friendly. Of course, non-exempt solvents may also be used if compatible with the ingredients of the present coating formulation.

In another embodiment, the present invention is a low-gloss dry-erase hardcoat that includes at least a portion of a substrate coated with the aforementioned coating formulation.

The substrate of the dry-erase hardcoat is typically formed of polymeric material (e.g., polyethylene terephthalate, polycarbonate, melamine, porcelain, coated paper, metal, and glass).

For example, DuPont Melinex 339 PET, White, 500 gauge, may be used as a substrate.

Generally, a substrate that is pre-treated on at least one side is used in the hardcoat formed from the present invention. This type of pre-treated polyester has enhanced adhesive properties. For instance, pre-treated polyesters such as white polyester and clear polyester may be used as substrates. Additionally films may be treated to improve hardcoat adhesion using corona discharge (i.e., an electrical discharge accompanied by ionization of atmospheric oxygen, which oxidizes the surface of the substrate, increases substrate surface tension, and improves its adhesive properties) or something similar.

In one aspect, the hardcoat formed from the coating formulation of the present invention may include a low-gloss of less than about 40 gloss units measured at 60 degrees. In some coating formulations, the gloss may be less than about 30 gloss units measured at 60 degrees.

Those skilled in the art know that specular gloss, i.e., the mirror-like reflection of light from a surface, is typically measured at an incidence angle of 60, 85, or 20 degrees using gloss meters. For instance, a 60-degree Novogloss gloss meter was used to measure the gloss of the coating formulation and the hardcoat of the present invention. The Novogloss unit is distributed by Paul N. Gardner Company in Pompano Beach Fla. It is manufactured by a UK company called Rhopoint Instrumentation. With respect to measurement, an internal test method based on ASTM D2457 was used.

Those of ordinary skill in the art would appreciate that one of the variables affecting gloss is coating weight. Surprisingly, the gloss of the aforementioned hardcoat decreases as the coating weight decreases. See FIG. 2, which plots 60-degree gloss versus the amount deposited in pounds per ream (lbs/ream) at a concentration of PHOTOMER® 5010 of 52.2% by weight. For the hardcoat formed from the aforementioned coating formulation, gloss is proportional to coating weight. Typically, at concentrations of the acrylate silica blend in the amount of between about 30 and 65 percent by weight of the coating formulation, the target 60 degrees gloss of between about 15 and 35 is obtained at coating weight of between about 1 and 10 lbs/ream.

Figure 2:
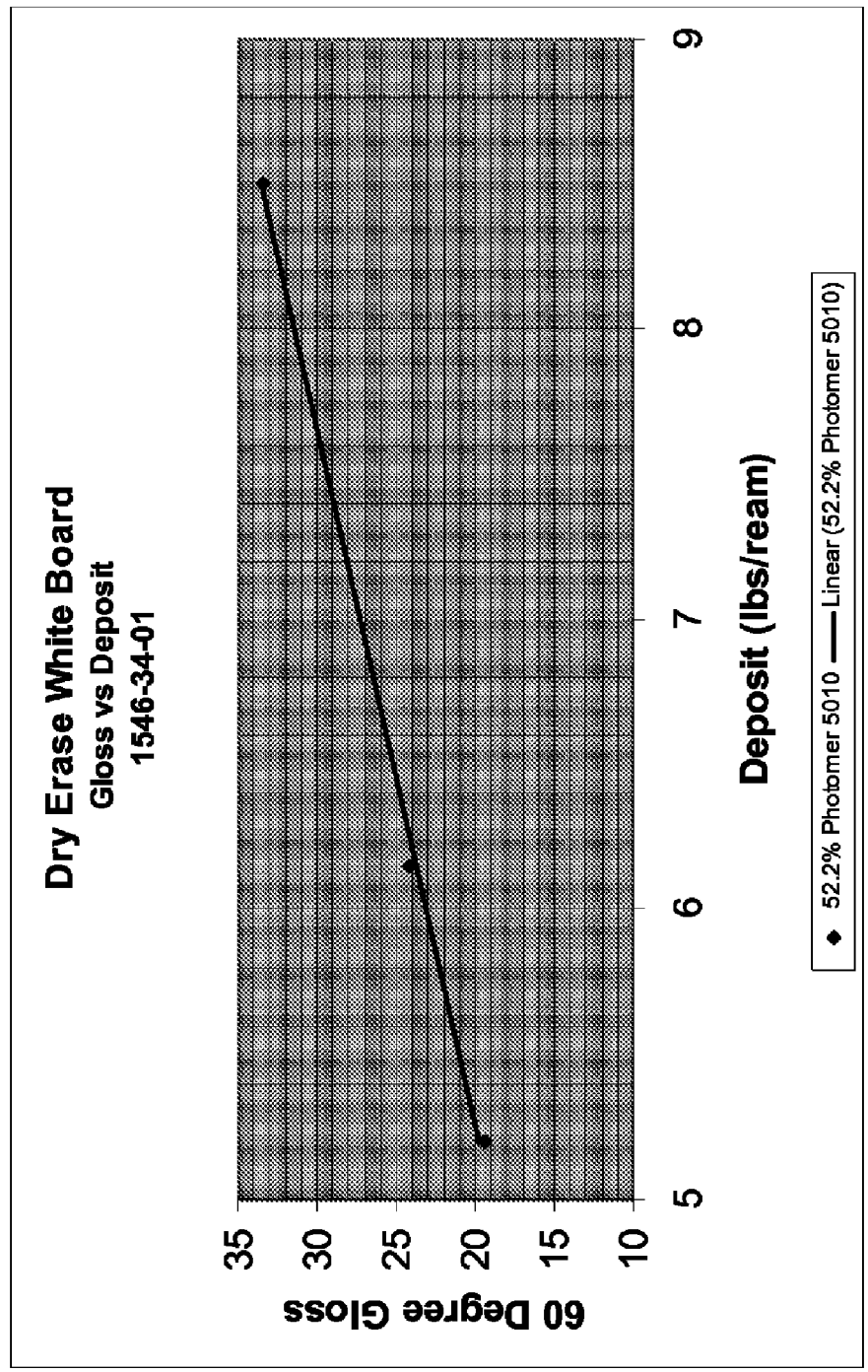
FIG. 2 is a graph depicting the gloss values versus coating weight for the coating formulation of the present invention.

FIG. 2 illustrates that when the hardcoat formed from the coating formulation of the present invention has a coating weight of between about 1 and 10 lbs/ream, the hardcoat has a gloss value of less than about 40 gloss units measured at 60 degrees. More preferably, at coating weight of between about 4 and 6 lbs/ream, the gloss value is less than about 35 gloss units measured at 60 degrees.

In another embodiment, the present invention is a dry-erase whiteboard that includes the aforementioned coating formulation, a substrate, and a backing board. Typically, the backing boards used in these whiteboards may be formed of polymeric material, such as polyethylene terephthalate, polycarbonate, melamine, porcelain, coated paper, metal, wood, or glass.

The hardcoat formed from the coating formulation of the present invention has enhanced dry-erase properties yet it demonstrates superior writability (i.e., a marker is able to wet the dry-erase surface formed from the present coating formulation without dewetting or reticulation.)

Table 1 (below) demonstrates some key optical and physical properties of the present dry-erase coating formulation:

TABLE 1

| 60 DEGREE GLOSS, MACHINE DIRECTION | 60 DEGREE GLOSS, TRANSVERSE DIRECTION | PENCIL HARDNESS | FLEXIBILITY, ½" BAR | CROSS-HATCH ADHESION |
| --- | --- | --- | --- | --- |
| 30.6 | 29.5 | HB | NO CRACKING | 5b, PASS |

To assess writing quality and completeness of erasure, dry-erase markers from different manufacturers were evaluated (e.g., Expo 2 Dry-erase marker of Sanford Corporation, Oak Brook, Ill. 60523; and Avery Marks-A-Lot Whiteboard Dry-erase marker of Avery Dennison Corporation; Brea, Calif. 92821).

Red, blue, green, and black color markers were evaluated. A dry-erase surface coated with a composition according to the present invention was marked with each of the above-referenced color test marker and allowed to dry for at least one minute and then erased using erasers from the respective named manufacturers.

The results indicated that all markers tested displayed good writability (e.g., wetting of the dry-erase surface).

The results further indicated that the ink on the dry-erase surface was easily removable and that the erasers from the same manufacturers demonstrated good erasability.

In a second experiment, the chemical resistance of the dry erase surface formed from the coating formulation of the present invention was evaluated by rubbing the dry erase surface with a Methyl-Ethyl-Ketone (i.e., MEK) saturated Webril Wipe (Fiberweb plc Corporate Office—London, 1 Victoria Villas Richmond GW2 9TW) a minimum of 30 cycles. After allowing the surface to dry, the writing and dry erase properties were evaluated using the above-named colors of test markers and erasing devices. In all cases, each marker displayed good writability and erasability using the test devices.

In addition, the 60-degree gloss value after rubbing the dry-erase surface with MEK saturated Webril Wipe was also evaluated to determine if surface gloss had been impacted. The 60-degree gloss values remained in the range of less than 35 gloss units.

The data in Table 1 further indicates that the dry-erase coating applied to polyester film formed from the coating formulation according to the present invention did not crack during processing using a half-inch bar (i.e., A flexibility test was performed by cycling a 1"×12" test strip of the dry-erase coating, applied to a polyester film substrate formed from the formulation of the present invention, such that the non-coated side of the substrate was wrapped around ~50% of the ½" bar, and cycled back and forth much like a belt on a pulley. After 10 cycles the coating was not damaged (no visual cracking, flaking, or loss of adhesion). Those skilled in the art will understand that coatings that withstand this test without cracking, flaking, or losing of adhesion are substantially flexible.

In yet another aspect, the invention is a process for providing low-gloss dry-erase hardcoat from the aforementioned coating formulation. Several coating methods suitable for coating flexible substrates in a roll-to-roll process including roll coating, gravure coating, meyer rod coating, and slot die coating can be used.

Typically, the slot die method is used due to its precision of coating weight control. This includes applying the coating formulation to a pre-treated substrate (e.g., web with good adhesion). The substrate along with the coating formulation is then dried in an oven. This vaporizes the solvent in the formulation. Thereafter, the coating is cured by exposing it to EB/UV radiation.

In one aspect, the coating may also be cured by exposing it to EB/UV radiation. This may be done under a nitrogen atmosphere. Those of ordinary skill in the art would know that excluding oxygen with nitrogen inerting helps prevent undesirable reactions with oxygen that leads to an under cured coating, which impacts hardness and enhanced dry erase properties.

In the specification and drawings, typical embodiments of the invention have been disclosed and, although specific terms have been employed, they have been used in a generic and descriptive sense only and not for purposes of limitation.

The invention claimed is:

1. A low-gloss dry-erase hardcoat comprising:
    a substrate; and
    a low-gloss coating formulation covering at least a portion of said substrate, wherein said coating formulation comprises:
    an acrylate silica blend;
    an acrylate selected from a group consisting of an aliphatic urethane acrylate and a polyester acrylate;
    a polymeric dispersant; and
    a polyfunctional reactive diluent.

2. A low-gloss dry-erase hardcoat according to claim 1, wherein said coating formulation further comprises at least one photoinitiator.

3. A low-gloss dry-erase hardcoat according to claim 1, wherein at least one side of the substrate is pre-treated.

4. A low-gloss dry-erase hardcoat according to claim 1, wherein said substrate comprises polymeric material.

5. A low-gloss dry-erase hardcoat according to claim 1, wherein said substrate is selected from a group consisting of polyethylene terephthalate, polycarbonate, melamine, porcelain, coated paper, metal, and glass.

6. A low-gloss dry-erase hardcoat according to claim 1, wherein the coating weight of said coating formulation on said substrate is between about 1 and 10 lbs/ream.

7. A low-gloss dry-erase hardcoat according to claim 1, wherein said coating formulation exhibits a gloss of less than about 40 gloss units measured at 60 degrees.

8. A low-gloss dry-erase hardcoat according to claim 1, wherein said coating formulation exhibits a gloss of less than about 30 gloss units measured at 60 degrees.

9. A low-gloss dry-erase static whiteboard comprising:
    a backing board;
    a substrate covering at least a portion of said backing board; and
    a low-gloss coating formulation covering at least a portion of said substrate, wherein said coating formulation comprises:
    an acrylate silica blend;
    an acrylate selected from a group consisting of an aliphatic urethane acrylate and a polyester acrylate;
    a polyfunctional reactive diluent; and
    a polymeric dispersant;
    characterized in that said coating formulation exhibits a gloss of less than about 40 gloss units measured at 60 degrees.

10. A low-gloss dry-erase static whiteboard according to claim 9, wherein said coating formulation further comprises at least one photoinitiator.

11. A low-gloss dry-erase static whiteboard according to claim 9, wherein said backing board comprises polymeric material.

12. A low-gloss dry-erase static whiteboard according to claim 9, wherein said backing board is selected from a group consisting of polyethylene terephthalate, polycarbonate, melamine, porcelain, particleboard, coated paper, glass, wood, and metal.

13. A low-gloss dry-erase electronic whiteboard, wherein a portion of said electronic whiteboard is coated with a coating formulation comprising:
    an acrylate silica blend;
    an acrylate selected from a group consisting of an aliphatic urethane acrylate and a polyester acrylate;
    a polyfunctional reactive diluent;
    a polymeric dispersant; and
    a polymeric dispersant.

14. A low-gloss dry-erase electronic whiteboard according to claim 13, wherein said coating formulation further comprises at least one photoinitiator.

15. A low-gloss dry-erase hardcoat comprising:
    a substrate; and
    a low-gloss coating formulation covering at least a portion of said substrate, wherein said coating formulation comprises:
    an acrylate silica blend;
    an acrylate selected from a group consisting of an aliphatic urethane acrylate and a polyester acrylate; and
    a polyfunctional reactive diluent;
    characterized in that said coating formulation exhibits a gloss of less than about 40 gloss units measured at 60 degrees.

16. A low-gloss dry-erase electronic whiteboard, wherein a portion of said electronic whiteboard is coated with a coating formulation comprising:
    an acrylate silica blend;
    an acrylate selected from a group consisting of an aliphatic urethane acrylate and a polyester acrylate;
    a polyfunctional reactive diluent; and
    a polymeric dispersant;
    characterized in that said coating formulation exhibits a gloss of less than about 40 gloss units measured at 60 degrees.

17. A substrate, coated by the process of applying a low-gloss coating formulation that includes an acrylate silica blend, an acrylate selected from a group consisting of an aliphatic urethane acrylate and a polyester acrylate, a polyfunctionalreactive diluent, at least one photoinitiator, a polymeric dispersant; and a solvent on a pre-treated substrate;
    drying said solvent from said coating formulation; and
    exposing said coating formulation on said pre-treated substrate to a radiation selected from a group consisting of electron beam and ultra violet radiation.

* * * * *